(No Model.)
T. J. KIELEY.
AUTOMATIC PRESSURE REGULATING VALVE.
No. 338,418. Patented Mar. 23, 1886.
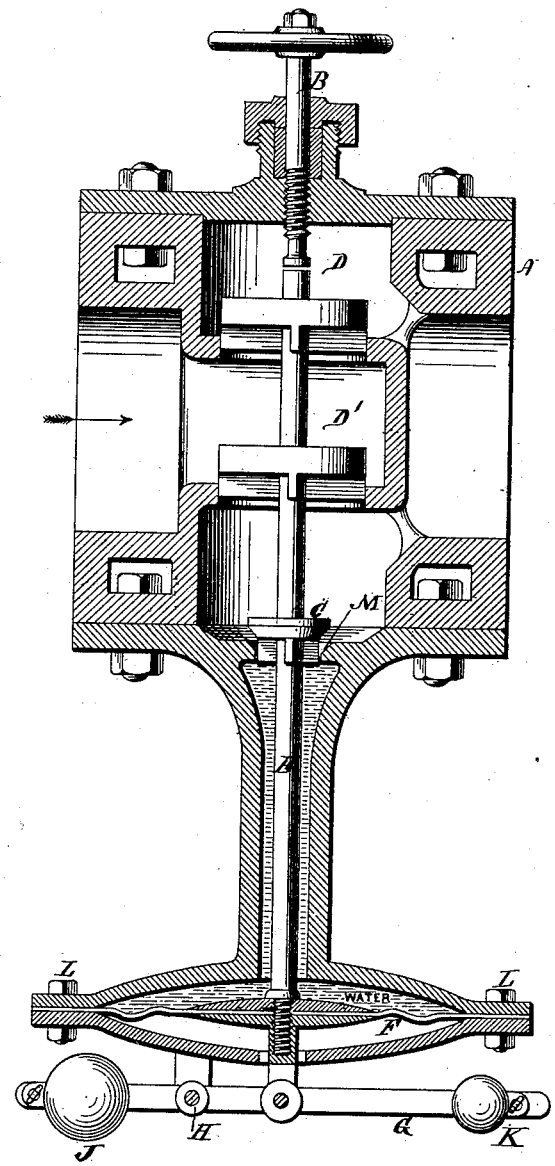

United States Patent Office.

TIMOTHY J. KIELEY, OF NEW YORK, N. Y.

AUTOMATIC PRESSURE-REGULATING VALVE.

SPECIFICATION forming part of Letters Patent No. 338,418, dated March 23, 1886.

Application filed November 16, 1885. Serial No. 182,991. (No model.)

*To all whom it may concern:*

Be it known that I, TIMOTHY J. KIELEY, of the city, county, and State of New York, have invented a new and useful Improvement in Automatic Pressure-Regulating Valves, of which the following is a full, true, and exact description, reference being had to the accompanying drawing.

My invention relates to a simple mechanism by means of which a constant pressure can be maintained in the chamber beyond the valve whatever may be the pressure entering the valve, provided said pressure be greater than the pressure desired beyond the valve.

My invention will be readily understood from the accompanying drawing.

A represents a valve-box of any suitable construction. The fluid, the pressure of which is to be regulated, which is generally steam, enters the apparatus on the left in the direction shown by the arrow. The regulating-valve, as shown, is a double-balanced piston-valve seating in cylindrical seats according to the well-known construction of such valves. The position of this balanced valve D D' is automatically controlled by the flexible diaphragm F, which is connected to the valve-stem E. This diaphagm is contained in a chamber located beneath the valves, as shown. This chamber is normally filled with water, thereby protecting the diaphragm from the action of the steam. The valve-stem itself is connected to the counterbalancing-lever G, pivoted at H. The weight J constantly tends to raise the valve-stem, and the amount of its lift is determined by the adjustment of the weight K. Connected to the valve-stem E, below the double valve D D', is the valve C, seating on the seat M at the top of the diaphragm-chamber. Above the valve-stem, and extending parallel therewith, is a screw-stem, B, which should be properly packed. By means of the hand-wheel beneath the stem it can be depressed or elevated, thereby determining the amount of opening of the piston-valve. It may be likewise used to close the valve C, for a purpose hereinafter to be described.

The operation of the valve is readily understood. In the position shown the valve is open. The extent of this opening may be determined by adjusting the screw-stem B. When the pressure in the chamber beyond the valve increases sufficiently, it acts upon the diaphragm F, in connection with the water upon it, so as to depress said diaphragm, thereby closing the piston-valve D D' until the pressure is sufficiently reduced to allow of the counter-balance again raising the balanced valve. The valve C is so adjusted as not to close so soon as the valve D D' closes. In case the diaphragm F should burst, as sometimes happens, a new diaphragm can be readily substituted without taking down the valve. In order to accomplish this result, the valve C is closed by screwing down upon the stem D, then by removing the bolts and nuts L a new diaphragm can be readily substituted, and on raising the stem B the valve will immediately resume its ordinary operation.

I do not broadly claim the combination of a diaphragm and regulating-valve, the same being old; but

What I claim as my invention, and desire to secure by Letters Patent, is—

1. The combination of a regulating-valve with a diaphragm controlling said regulating-valve located in a chamber separate from the valve-chamber, and a valve normally open but capable of being closed so as to shut off the diaphragm-chamber from the valve-chamber for the purpose of removing the diaphragm, substantially as described.

2. The combination of the balanced regulating-valve D D', the diaphragm F, the valve C, and the screw-stem B, whereby the extent of opening of the valve D D' may be determined and the valve C may be closed, if desired, substantially as described.

TIMOTHY J. KIELEY.

Witnesses:
 GEO. H. EVANS,
 WM. A. POLLOCK.